April 16, 1968 D. H. MOONEY, JR 3,378,841

DUAL TRANSMITTER SYSTEM FOR RELIABILITY

Filed Aug. 30, 1966 2 Sheets-Sheet 1

David H. Mooney Jr.,
INVENTOR.

BY Harry M. Saragovitz
Edward J. Kelly
Herbert Berl
Robert C. Sims

David H. Mooney Jr.,
INVENTOR.

BY Harry M. Saragovitz
Edward J. Kelly
Herbert Berl
Robert C. Sims

United States Patent Office 3,378,841
Patented Apr. 16, 1968

3,378,841

DUAL TRANSMITTER SYSTEM FOR RELIABILITY

David H. Mooney, Jr., Severna Park, Md., assignor, by mesne assignments, to the United States of America as represented by the Secretary of the Army Filed Aug. 30, 1966, Ser. No. 576,524
2 Claims. (Cl. 343—14)

ABSTRACT OF THE DISCLOSURE

A radar transmitter including an improved power amplifier system for transmitting two radio frequencies on a time-shared basis. Two frequencies are alternately applied to two separate amplifiers, which are controlled by their respective modulator units. The signals are transmitted on a continuous alternate basis for scanning with no discontinuity. The power amplifier and modulator units operate at one-half the total required radiated power.

Figure 1:
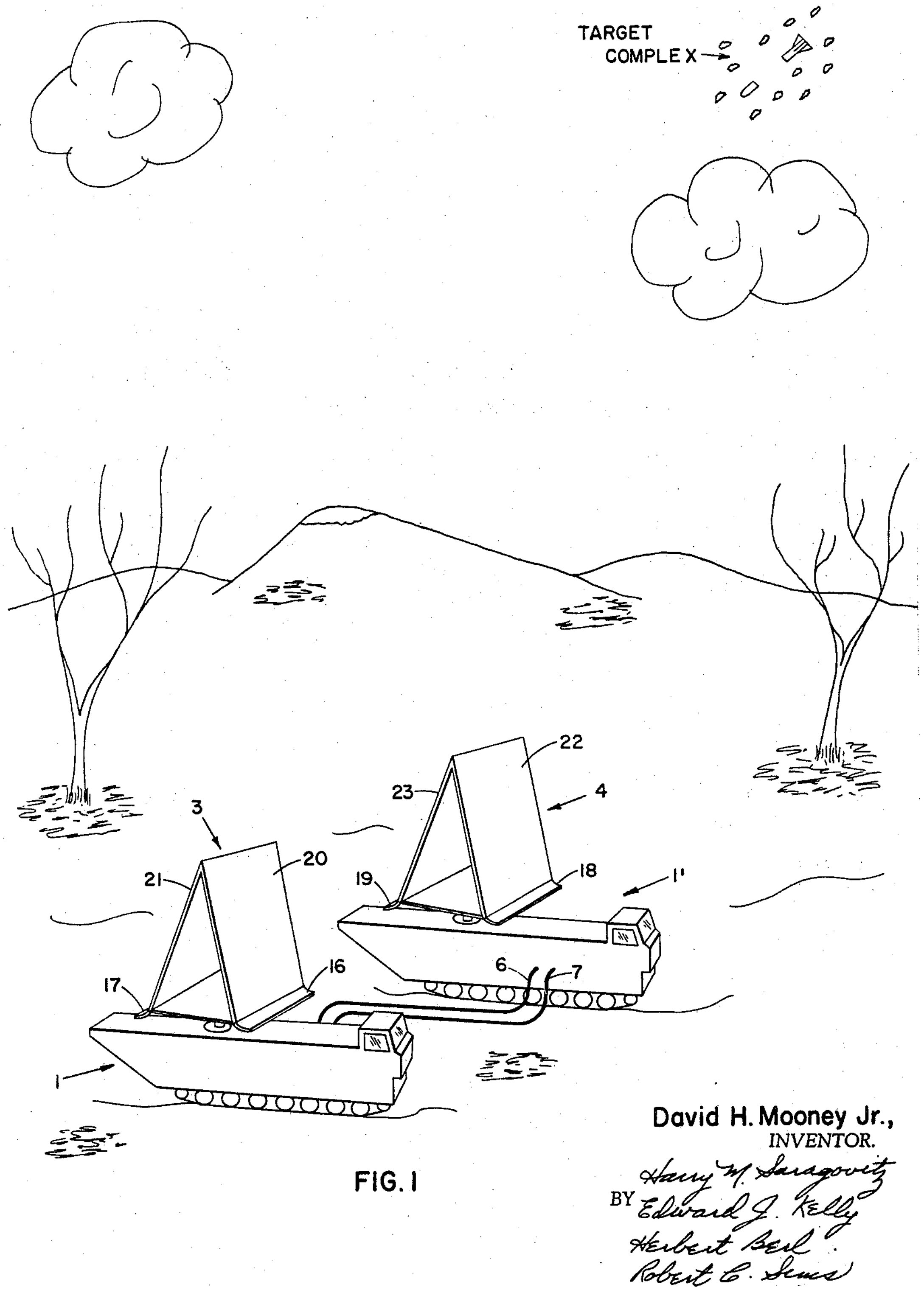

This invention relates to an improvement of a power amplifier chain of a transmitter system in aperture added radars. Specifically, this invention relates to the use of two RF amplifiers and their modulator units in a time-shared manner so that they are required to operate at one-half the total radiated power of the whole unit.

My copending application Ser. No. 576,503 filed Aug. 26, 1966, describes a transmitter system for aperture added radars. Such a system has inherent redundance in its frequency generation portion, since loss of a single radio frequency will only reduce radiated power by 3 db in one radar. Analysis has shown, however, that its power amplifier chain is a weak link in its transmitter reliability. Therefore, there is a need for a simple technique of improving this situation. This system used the standard technique of paralleled RF amplifiers of the klystron or TWT variety, which are both pulsed in synchronism by a common modulator. This arrangement is plagued with phasing problems, since the RF phase shifts through such devices are typically 3000°, whereas the allowable phase difference between the two tubes is only a few degrees. This situation is bad enough at a fixed frequency and is intolerable in a frequency diversity system. The problem arises, basically, due to the simultaneous pulsing.

It is, therefore, an object of the invention to provide an improved power amplifier chain for use in the transmitter of aperture added radars.

A further object of the present invention is to provide a power amplifier chain having RF amplifiers which are time-shared.

A still further object of this invention is the provision of a power amplifier chain in which the power amplifier and modulator units operate at one-half the total required radiated power.

Figure 2:
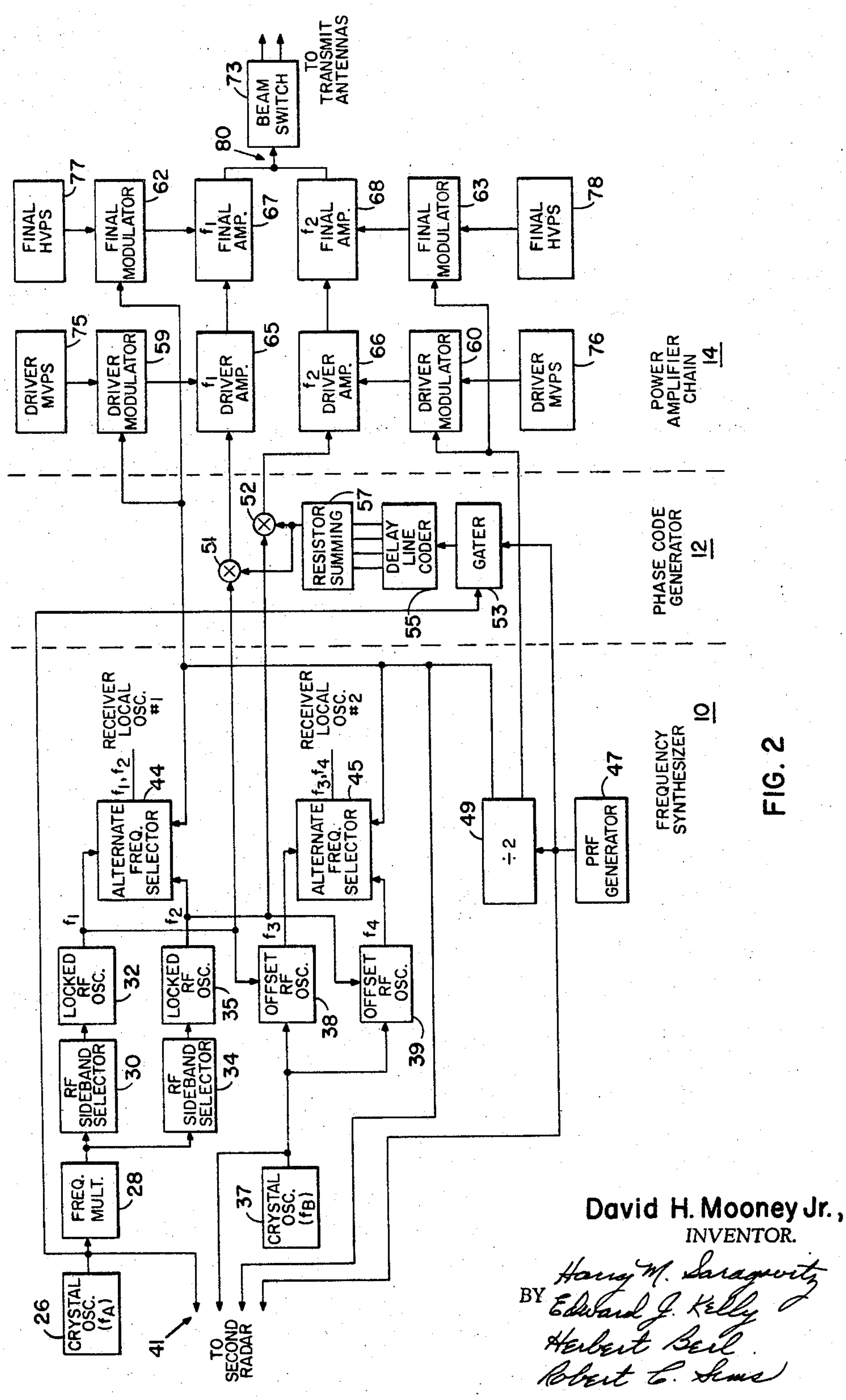

The invention further resides in certain novel features of construction, combinations, and arrangements of parts. Further objects and advantages of the invention will be apparent to those skilled in the art to which it pertains, from the following description of the preferred embodiment thereof described with reference to the accompanying drawing, which forms a part of the specification, and wherein the same reference characters represent corresponding parts throughout the drawing, and in which:

FIGURE 1 is a diagrammatic representation of the overall search radar system in which the present invention is contained, and FIGURE 2 shows a block diagram illustrating a preferred form of the invention.

Aperture adding is a technique disclosed by P. H. Pincoffs in his patent issued on Dec. 15, 1964, having Patent Number 3,161,870. This technique requires that the data from two or more radars be combined in each radar and processed thereby. Each of the radars will radiate at a different frequency, but each has receivers to receive all of the frequencies. This technique gives an improved range performance for a given transmitter power. The overall search radar complex is shown in FIGURE 1. The primary function of the search radar complex is the initial detection of an approaching target complex (consisting of the warhead. last stage rocket, and the accompanying fragments; plus any decoys). The system normally consists of two identical search radar vehicles 1 and 1', having their antennas 3 and 4 mounted for rotation. The vehicles are located several hundred feet apart and are interconnected by low frequency cables 6 and 7. These radar vehicles act as a team under normal circumstances, however, when desired on necessary, a single vehicle can perform all the search functions with reduced range performance. This arrangement provides the highly desirable feature of slow death.

The transmitter for each vehicle is a coherent master-oscillator power amplifier type, incorporating a phase-coded pulse compression transmission. Also pulse-to-pulse frequency hopping is provided by the transmitter. The pulse repetition frequency is kept low enough so that true range is obtained directly, and the pulse width is sufficiently great so that doppler can be obtained from a single pulse return. Referring to FIGURE 2, it can be seen that the transmitter consists of a frequency synthesizer 10, phase code generator 12, and power amplifier chain 14.

The frequency synthesizer 10 generates the stable microwave and I.F. reference signals required for the conventional and the aperture adding functions of the radar unit. The synthesizer provides transmitted frequencies of two widely separated values, $f_1$ and $f_2$. At the same time, the synthesizer provides the local oscillators of the receiver with the signals to alternately receive on these frequencies, and on the frequencies ($f_3$ and $f_4$) of the other radar unit.

The phase code generator 12 operates at I.F. and serves to suitable code the transmitter output so that both range and doppler information can be simultaneously extracted from the target. The phase code generator output is mixed with the synthesizer $f_1$ and $f_2$ outputs and sent to power amplifier chain 14.

The power amplifier chain 14 amplifies the signals from phase code generator 12, modulates them, and sends them to the transmit antennas of one vehicle where a fan beam will be transmitted having its thin dimension in azimuth.

The transmitter antennas are shown in FIGURE 1 as being mounted back-to-back on the vehicles 1 and 1'. Transmitting arrays 16 and 17 are mounted on vehicle 1, and transmitting arrays 18 and 19 are mounted on vehicle 1'. Back-to-back receiver antennas 20–23 are also mounted on the vehicles. The antennas are mechanically scanned in azimuth.

The transmitter of FIGURE 2 consists of a stable crystal oscillator 26 operating at an I.F. frequency $f_A$. The output of oscillator 26 is multiplied by frequency multiplier 28 to RF such that a plurality of spectral lines is available in the C-band region. A first adjustable frequency selector 30 will filter out an appropriate component and a RF oscillator 32 is phase-locked to it to give the frequency $f_1$. A second frequency selector 34 and oscillator 35 are set to a different multiple sideband of $f_A$ so as to generate $f_2$.

A second crystal oscillator 37 operating at $f_B$ is used as an offset for $f_1$ and $f_2$ so that $f_3$ and $f_4$ can be generated. Separate phase locked oscillators 38 and 39 generate $f_3$ and $f_4$ from their inputs of $f_1$ and $f_B$ for offset oscillator 38, and $f_2$ and $f_B$ for offset oscillator 39. In this fashion all four frequencies are locked to two low frequency sources, and all can be changed when desired.

Since only low frequency cables interconnect the two search radar vehicles, the frequency synchronization between them must be at I.F. Sinces all frequencies needed at the second radar can be generated from $f_A$ and $f_B$, only these frequencies need be transmitted over the wire data link 41. Identical multipliers and locked oscillators, located in the second radar vehicle can reproduce the four RF signals required. Therefore, the transmitters of the other vehicles need not have oscillators such as oscillators 26 and 37. Further, the PRF generator 47 and the 2/1 divider 49 outputs are sent to the other vehicles. In this way all the frequencies transmitted will be locked to oscillators 26 and 37. However, because of the requirement of slow death, all the vehicles will have all the components, but the corresponding oscillators to 26 and 37 will be set in an off condition, as will the PRF and 2/1 divider.

The pair $f_1$ and $f_2$ and the pair $f_3$ and $f_4$ must be alternately switched once each repetition period of the transmitter. Two alternate frequency selectors 44 and 45 are used to perform this function insofar as the receiver local oscillators are concerned. Selectors 44 and 45 are controlled by the pulse repetition frequency generator 47 which is connected to their control inputs by way of a 2/1 frequency divider 49. Each of these selectors consists of a hybrid coupler-diode switch which can be switched at an extremely rapid rate by electronic control of the diode. The output of the two selectors are appropriate for use as the local oscillator signals #1 and #2 for the receivers of the radar vehicle.

The output ($f_1$) from oscillator 32 is further fed to one input of mixer 51 of phase code generator 12. The output ($f_2$) from the oscillator 35 is fed to one input of mixer 52 of the phase code generator. The phase code generator operates at I.F. and serves to suitably code the transmitter so that both range and doppler information can be simultaneously extracted from the target. The coder is controlled by PRF generator 47 by way of its gater 53. A multi-tapped delay line 55 feeds the other inputs of mixers 51 and 52 by way of resistor summing 57. The multi-tapped delay line is used to generate an I.F. signal which has a total pulse length typically of 450 microseconds, but with segments of 3.6 microseconds each. They will have either a 0° or 180° relative phase. The phase reversals are obtained by having either plus or minus polarity taps available from the delay line. These taps are spaced by the 3.6 microsecond segment interval. By selecting an appropriate psuedo-random code for the phases, reconstitution of the target signal into a 3.6 microsecond pulse will take place in a similar line, in the receiver. The coded I.F. signal is heterodyned with the outputs $f_1$ and $f_2$ in the mixers so as to obtain an RF phase-coded signal suitable for use as the transmitted signals.

The transmitted signal, however, must be hopped between the two frequencies ($f_1$ and $f_2$) on alternate pulses. This is done in the power amplifier chain by providing separate RF amplifier units for each of these frequencies. The 2/1 frequency divider is connected to the driver modulators 59 and 60 and to the final modulators 62 and 63 so as to cause the modulators to pulse their corresponding amplifiers 65–68 alternately. In this way, the amplifier unit for one frequency is timed-shared with the amplifier unit of the other frequency. Also only ½ power modulators and amplifiers are needed. The outputs of amplifiers 67 and 68 are added to get the desired hopped signal to be transmitted. This is sent to the transmit antennas by way of beam switch 73. The power supplies 75–78 and the modulators must maintain a peak phase modulation in order of one degree or less to maintain an RF having an instantaneous bandwidth of 3.5 percent centered at 5750 mc.

This arrangement of the power amplifier chain eliminates the phasing problems and requires no adjustments when the frequency changes. If one amplifier fails, the other continues to function normally, and the only effect on performance is a reduction of 3 db in transmitted power.

The output 80 of the power amplifier chain is sent to beam switch 73 which is mounted on the antenna of one of the vehicles. As the antenna (for example, antenna 3 of vehicle 1 of FIGURE 1) is rotated mechanically, beam switch 73 will alternately connect output 80 to the transmitting antennas 16 and 17. Beam switch 73 will change connections every 180° of azimuth. By so doing, this allows scanning of 180° of the horizon without the need of oscillating the antenna or of having the scan time be discontinuous. If whole horizon scan is desired, the beam switch can be locked so that it will not switch; therefore, only one antenna will transmit and will transmit for the full 360°.

While in accordance with the provisions of the statutes I have illustrated and described the best forms of the invention, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features. Accordingly, I desire the scope of my invention to be limited only by the appended claims.

I claim:

1. In a transmitter system which is to transmit first and second frequencies alternately and has signal generating means to generate these frequencies; the improvement comprising first and second amplifier units connected to said signal generating means for amplifying said first and second frequencies respectively, wherein said amplifier units each comprises an amplifier and a modulator foı controlling said amplifier; a pulse rate generating means, a 2/1 frequency divider connecting said pulse rate generating means to the modulator of each amplifier unit so that said amplifier units will be modulated to have a pulse output alternately; means connecting outputs of said amplifier units to an antenna means; and wherein said system is to be used in a radar system in conjunction with a second transmitter having third and fourth frequencies generated by said signal generating means, and further comprising frequency selector means for connecting all the frequencies to a receiver of the radar system.

2. A transmitter system as set forth in claim 1, further comprising a phase code generating means connected between said signal generating means and said amplifier units.

References Cited

UNITED STATES PATENTS

| | | | |
|---|---|---|---|
| 2,933,700 | 4/1960 | Hoffman | 343—17.5 X |
| 3,020,399 | 2/1962 | Hollis | 250—8 |
| 3,114,106 | 12/1963 | McManus | 325—56 |

RODNEY D. BENNETT, *Primary Examiner.*

J. P. MORRIS, *Assistant Examiner.*